Dec. 23, 1924.
D. B. MILLS
1,520,503
COUPLING FOR ELECTRICAL CONDUCTORS
Filed April 19, 1923
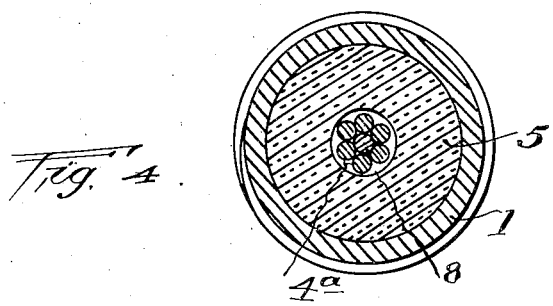
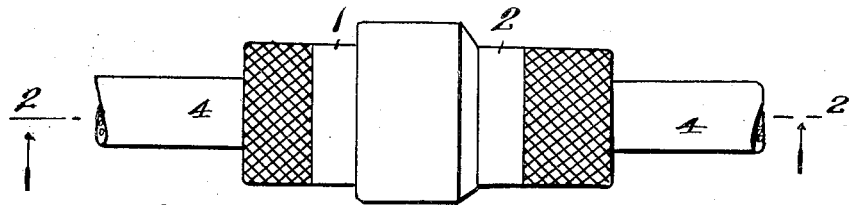
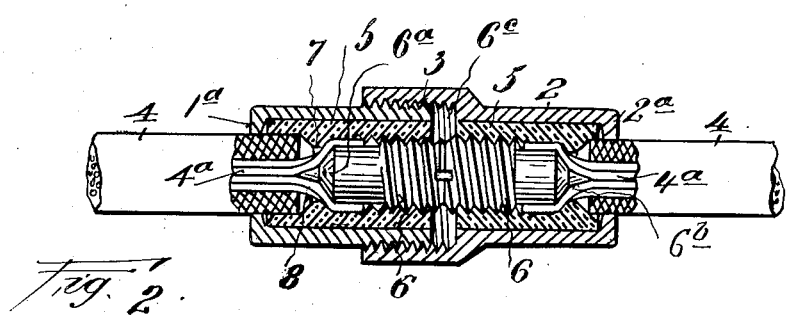
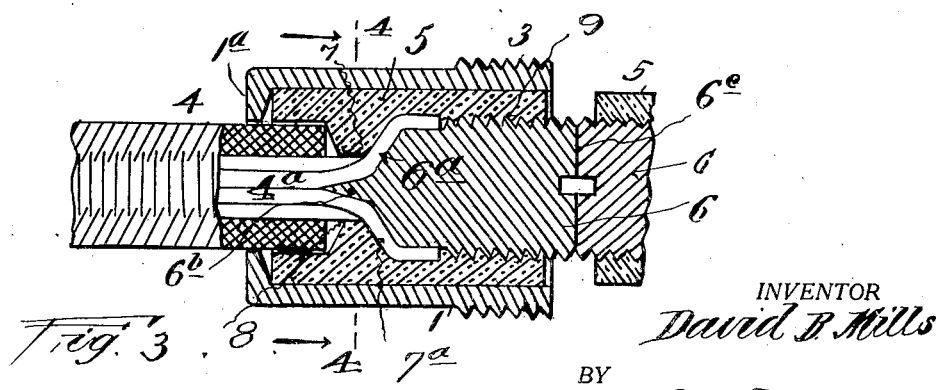
INVENTOR
David B. Mills
BY
T. F. Bourne
HIS ATTORNEY Patented Dec. 23, 1924.

1,520,503

UNITED STATES PATENT OFFICE.

DAVID B. MILLS, OF MONTCLAIR, NEW JERSEY.

COUPLING FOR ELECTRICAL CONDUCTORS.

Application filed April 19, 1923. Serial No. 633,098.

*To all whom it may concern:*

Be it known that I, DAVID B. MILLS, a British subject (Canadian), and resident of Montclair, in the county of Essex and State of New Jersey, have invented certain new and useful Improvements in Couplings for Electrical Conductors, of which the following is a specification.

The object of my invention is to provide simple and efficient means to detachably connect together the ends of electric conductors, which shall remain securely connected in use, making efficient electrical contact for closing the circuit between such conductors, and not liable to become detached.

My invention comprises novel details of improvement that will be more fully hereinafter set forth and then pointed out in the claims.

Reference is to be had to the accompanying drawings forming a part hereof, wherein—

Fig. 1 is a side view illustrating my improved coupling on insulated electric conductors;

Fig. 2 is a longitudinal section substantially on the plane of line 2, 2, in Fig. 1;

Fig. 3 is an enlarged detail section; and

Fig. 4 is a cross section on line 4, 4, in Fig. 3.

Similar numerals of reference indicate corresponding parts in the several views.

The numerals 1, 2, indicate complemental coupling members adapted to be detachably connected together by any suitable means, such as by screw threads indicated at 3. The members 1, 2 are tubular having ends at $1^a$, $2^a$, provided with openings to receive the insulation 4 of insulated electrical conductors. At 5 are sleeve members attached to the conductors and provided with exposed contacts shown in the form of screws 6, to engage one another to close the circuit between the conductors. The sleeve members 5 are adapted to fit within the coupling members 1, 2. The screws 6 are fitted in the sleeve members 5 and engage wires $4^a$ of the conductors to make electrical contact therewith and to secure said wires to the sleeve members. The sleeve members 5 have bores provided with walls 7 between their ends, said walls having apertures 8 through which the wires $4^a$ extend to be engaged by the corresponding screws 6, the insulation 4 fitting in the adjacent outer ends of said bores. The inner surfaces of the walls 7 are shown tapering at $7^a$ providing seats and the adjacent ends of screws 6 are correspondingly tapered or cone-like at $6^a$ to oppose the wires $4^a$, the screws being provided with projections $6^b$ at their inner ends adapted to pierce the wires $4^a$ of the conductor cable and spread the same within the bores 8. The sleeve members 5 have threads 9 in their bores to receive the threads of the screws 6. The screws 6 are of such length that when their surfaces $6^a$ force the wires $4^a$ against the seats $7^a$ the outer ends $6^c$ of said screws will project beyond the adjacent ends of the corresponding sleeve members 5 so that when the parts are assembled and secured together the screws 6 at the ends of two conductors will engage and make electrical contact.

The coupling members 1, 2 may be made of metal and the sleeve members 5 made of suitable insulation, or the members 1, 2 may be made of insulating material in which case the sleeve members 5 may be made of insulating material or of metal.

The coupling members 1, 2 may be placed upon the conductors 4 loosely, the insulation at the ends of the conductors being removed to expose the cable wires 4 which are passed through the bores or apertures of walls 7 of the sleeve members, and the screws 6 then may be screwed into the sleeve members to force the wires $4^a$ against the seats $7^a$ to secure said parts together, the surface $6^c$ of the screws being exposed or protruding at the ends of the sleeve members. The members 1, 2 will be retained upon the conductors by the sleeve members 5. When the conductors are to be connected electrically the members 1, 2 are screwed together which will draw the sleeve members and the conductors toward one another to force the screws 6 against each other, the ends $1^a$, $2^a$ of the members 1, 2 abutting against the adjacent ends of sleeve members 5 causing the screws 6 to be forced together and retained in contact. When it is desired to disconnect the conductors it is merely necessary to separate the coupling members 1, 2.

By means of my improvement a simple and efficient coupling for conductors is provided wherein the parts are not liable to become detached and firm contact between the screws 6 may be maintained so that the circuit of the connected conductors will not be broken.

Having now described my invention what I claim is:

1. A coupling for electric conductors comprising complemental coupling members having means to detachably connect them, sleeve members within said coupling members having means to receive conductor wires, and screws in said sleeve members adapted to engage said wires and secure them to the sleeve members, the outer ends of said screws being exposed at adjacent ends of the sleeve members to contact one another to close the circuit between the conductors within the coupling members when the latter are connected.

2. A coupling for electric conductors comprising complemental coupling members having means to detachably connect them, and provided with bores, sleeve members fitted in said bores, said sleeve members having bores and inner apertured walls providing seats for conductor wires, screws fitted within said sleeve members adapted to force the wires to said seats to secure the wires to the sleeve members and make electrical contact between the wires and the screws, said screws having their outer ends exposed at adjacent ends of said sleeve members to contact one another within the coupling members when the coupling members are assembled.

3. A coupling for electric conductors comprising complemental coupling members having means to detachably connect them, and provided with bores, said members having outer ends provided with openings for insulation of the conductors, sleeve members fitted within said bores and adapted to engage said ends of said coupling members, said sleeve members having bores and inner apertured walls to receive the conductor wires, said walls being provided with seats for the wires, the bores of said sleeve members having threads, and screws fitted in said bores to engage said threads, said screws having inner ends provided with projections to pierce the wires, said ends of the screws being in position to force the wires against said seats to secure the wires to the sleeve members and make electrical contact between the wires and the screws, being of such length when engaging said wires as to expose their outer ends to engage one another when the coupling members are assembled and their outer ends force the sleeve members toward one another.

DAVID B. MILLS